July 28, 1964
T. J. AMBROSE
3,142,836
TRANSPONDER CONTROL CIRCUIT
Filed June 8, 1962
2 Sheets-Sheet 1
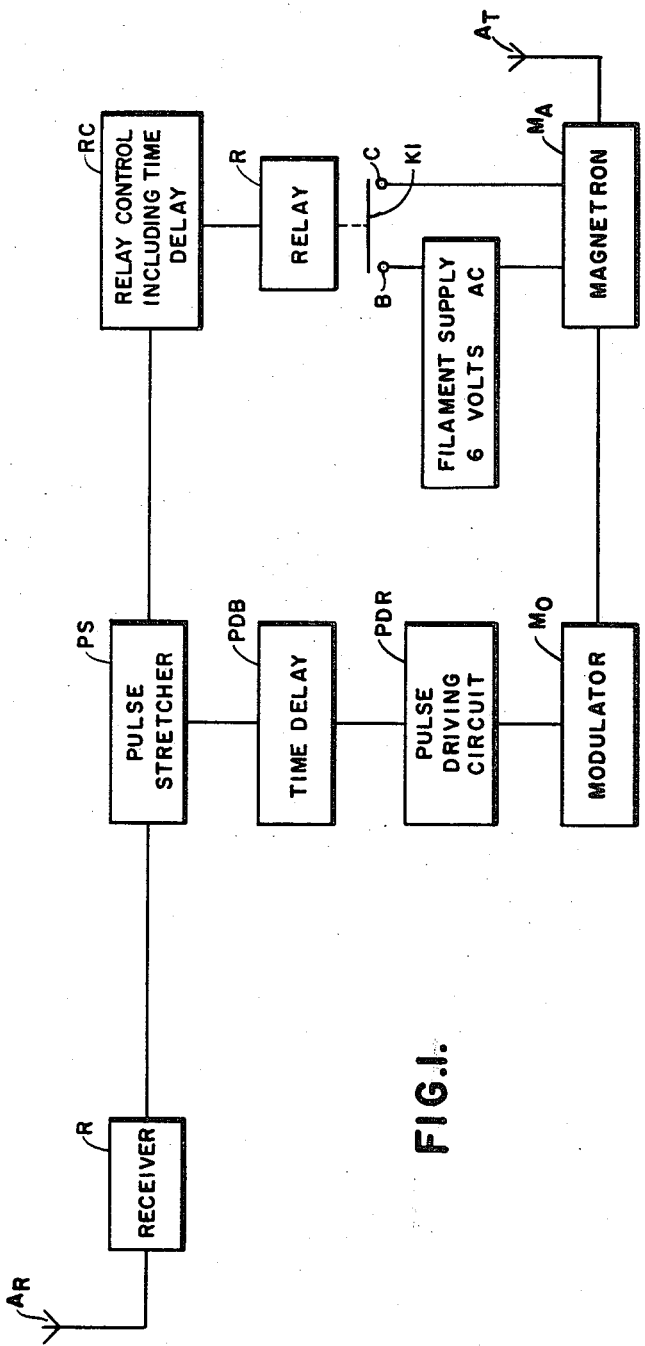
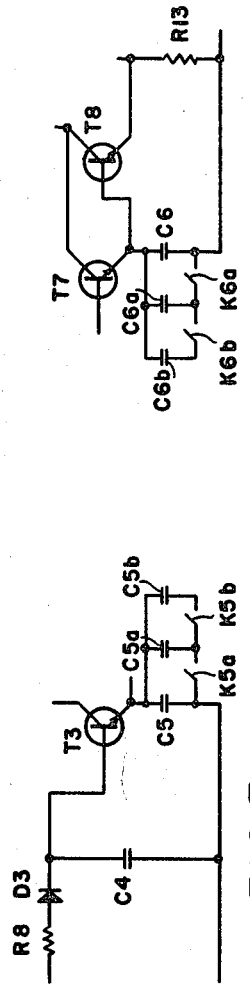
INVENTOR
Thomas J. Ambrose
BY George K Spencer
ATTORNEY INVENTOR
Thomas J. Ambrose
BY George L. Spencer
ATTORNEY 3,142,836
TRANSPONDER CONTROL CIRCUIT
Thomas J. Ambrose, Fairfax, Va., assignor to Aero Geo
Astro Corporation, Alexandria, Va.
Filed June 8, 1962, Ser. No. 201,060
6 Claims. (Cl. 343—6.8)

This invention relates generally to the transponder art and, more particularly, to a circuit for use in controlling transmitter activity in a radar transponder.

In recent years there has been a very great increase in the use of radar transponder beacons, both fixed and movable. For example, they are used as space beacons, and accordingly this type of equipment must be provided with a self contained power supply. Such equipment may, for example, use a magnetron as the transmitting element. Now, before a magnetron may be fully operative, the filament thereof must be properly heated, and this will take a period of time ranging anywhere up to about 45 seconds. Thus, there is a time lag of at least 45 seconds between the time the first interrogation pulse is received and the transmitter of the transponder becomes available to provide a response signal.

Bearing in mind that this equipment must be provided with rather small, self contained power supplies, it may be seen that a problem may be created when there are variations in interrogation signals. For example, there may be an interrogation series of pulses which lasts for several minutes, and then there may not be any further interrogation pulses for several minutes or even hours thereafter. Since the conservation of the portable power supply is a major factor in such equipment, it is disadvantageous to allow the transponder equipment to remain in a "ready" condition, during the period of time when no interrogation signals are being received, since while the transponder is in a ready condition, it is constantly draining a substantial amount of power from the power supply.

One method of preventing this is to change the transponder equipment from its "ready" or "interrogation" mode into a "quiescent" mode. In the interrogation mode the device will accept interrogation pulses and will respond thereto, but upon cessation of such interrogation pulses it will change from its ready or interrogation mode into its quiescent mode, wherein, for example, the power supply to the magnetron filament is removed in order to conserve the power supply. In such an arrangement, when interrogation pulses are initially received and the mode changes from quiescent to ready, it is necessary that a magnetron filament warm-up period of 45 seconds or the like be provided before there is a response to the interrogation signal.

Such a construction solves, to a limited extent, the problem of the drain on the power supply, but it is still somewhat disadvantageous due to the fact that occasionally a burst of interrogation signals is temporarily interrupted, perhaps for a fraction of a second, perhaps for several seconds. In such an event, this apparatus will change from its interrogation to its quiescent mode and will not be available for immediate response but must first await the termination of the warm-up period. This, of course, provides unnecessary delays in the response to interrogation signals and also provides harmful temperature gradients in the magnetron filament which decreases the useful life thereof.

With these defects of the prior art in mind, it is a main object of the present invention to provide a circuit device for transponders or the like which switches a transponder from an interrogation to a quiescent mode upon cessation of interrogation signals, but which will not switch when there is but a temporary cessation of such signals.

Another object of the present invention is to provide a device of the character described wherein a time delay is provided in the device which causes a delay in switching from the interrogation to the quiescent mode of operation.

A further object of the present invention is to provide a relay for switching from one mode of operation to another, as well as a control circuit for such relay, both of which do not constantly drain the power supply.

Still a further object of the invention is to provide a disabling circuit to block pulses from arriving at the magnetron until the filament warm-up period has terminated.

Yet another object is to provide a circuit for assuring that genuine interrogation pulses and not spurious signals are being detected before pulses may pass the output of the pulse stretcher.

These objects and others ancillary thereto are accomplished according to preferred embodiments of the invention wherein a transponder is provided which utilizes a relay for switching from the interrogation to the quiescent mode. In order to prevent switching of the relay upon temporary cessation of interrogation pulses, a time delay is provided before the relay will switch from the interrogation to the quiescent mode. Furthermore, the relay is provided with a control circuit which actuates the coils of the relay only at the time of switching, and thereafter removes the relatively heavy current from the coils in order to conserve power, whereby a surge of power through the relay only takes place at the instant of switching.

A disabling circuit is also provided to prevent pulses from being delivered to the magnetron until a warm-up period has expired after switching from the quiescent to the ready mode.

An integrator stage is provided as the initial stage of the relay control circuit and it must receive a predetermined number of pulses before it will allow the pulses to enter the control circuit proper.

Additional objects and advantages of the present invention will become apparent upon consideration of the following description when taken in conjunction with the accompanying drawings in which:

FIGURE 1 is a block diagram of the transponder indicating the functional relationship between the various components thereof.

FIGURE 3 is a fragmentary circuit diagram indicating an arrangement for varying the capacitance of the integrating stage to thus vary the number of pulses which will be effective to switch the relay.

FIGURE 4 is a fragmentary circuit diagram of the time delay circuit indicating an embodiment for varying the amount of time delay.

Figure 2:
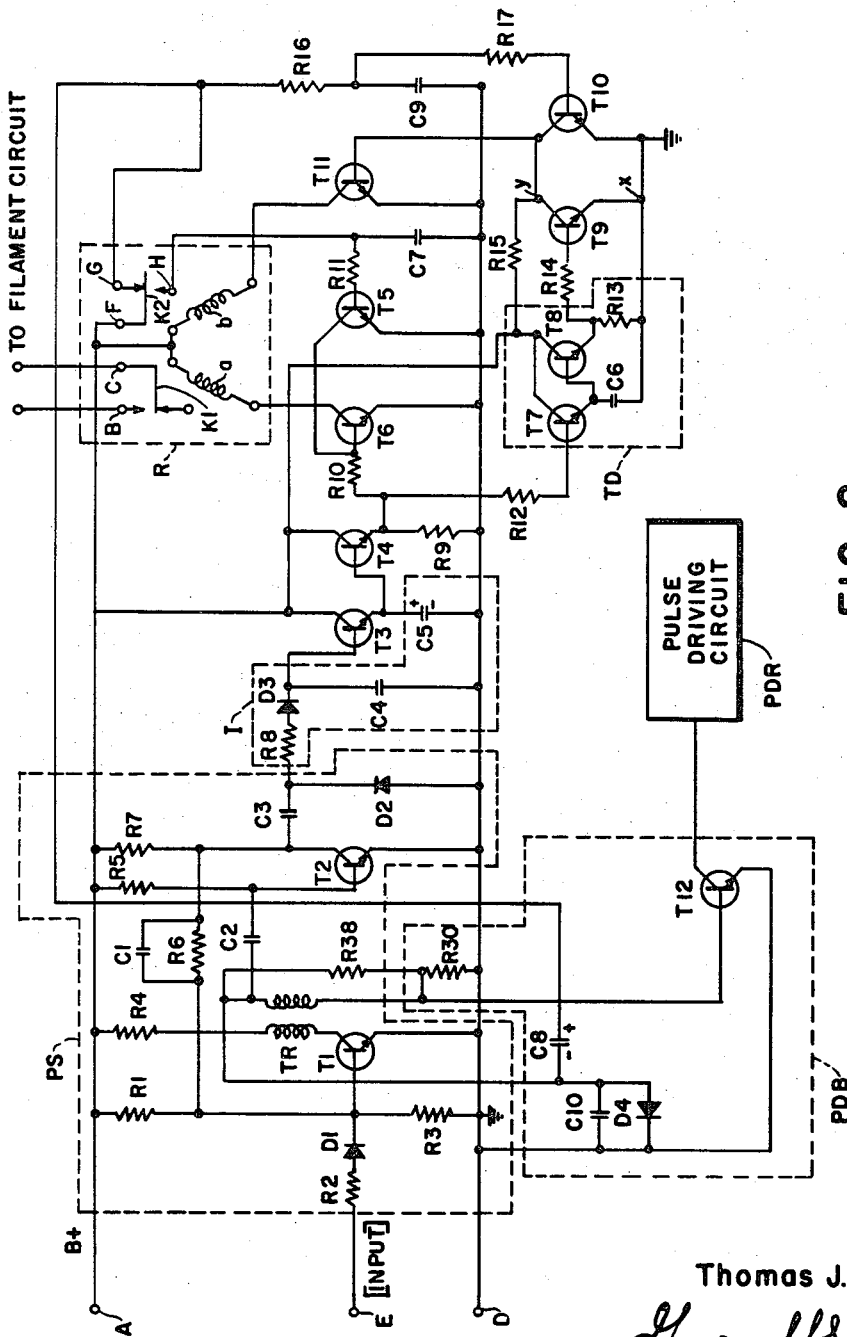
FIGURE 2 is a schematic diagram of the pulse stretcher, the relay control including time delay, the relay, and the pulse disabling circuit.

With more particular reference to the drawings, FIGURE 1 indicates a functional block diagram of a transponder constructed in accordance with the present invention. A receiving antenna $A_R$ is connected to the input of a receiver R for receiving radar pulse interrogation signals. The signals are fed from the output of the receiver to a pulse stretcher PS which increases the duration of the pulses. The output of the pulse stretcher is connected with a relay control including a time delay RC, the output of which is connected directly to the relay R.

The actual transmitting element of the arrangement is a magnetron $M_A$, the output of which is connected to an antenna $A_T$ for transmitting wave energy. The magnetron has a filament which is heated by means of a 6 volt A.C. filament supply and the circuit connecting them is open between terminal B and terminal C. The relay R controls a contact K1 for opening and closing the circuit between terminals B and C. This, then, provides the heating voltage for the magnetron filament. In order to drive the magnetron, pulses are taken from the pulse stretcher to a pulse disabling circuit PDB and then to a pulse driving circuit PDR to a modulator $M_O$, and the high voltage pulses from the modulator are then sent to the magnetron.

Although two separate antennas are illustrated in the drawing, a single antenna may be used, together with a circulator for properly isolating the receiving and transmitting circuits from each other.

A brief description of the operation of the circuit will now be set forth. The interrogation mode of the circuit will be effective when the contact K1 bridges the terminals B and C, and thus the filament of the magnetron is heated. In such a condition, any pulses passing from the modulator to the magnetron will cause the magnetron to fire bursts of energy. On the other hand, in the quiescent mode, the contact K1 does not bridge terminals B and C, and there is no heating voltage across the filament of the magnetron. Thus, although the power supply is connected to the device, relatively little current is drained during the quiescent mode, since the filament of the magnetron is not drawing any current.

When the receiver R receives interrogation pulses, they are sent to the pulse stretcher PS, to the relay control RC, and to the relay R, causing contact K1 to bridge the terminals B and C and thus connect the filament supply to the filaments of the magnetron to heat the filament. At the same time, pulses from the pulse stretcher are sent to the pulse disabling circuit PDB which causes a disablement or delay equal to the time required by the magnetron for warm-up upon initial actuation of the relay. Thus, for this period of time, pulses will not pass through PDB to the pulse-driving circuit. This provides time for the filament of the magnetron to heat to the proper temperature. After a delay of .45 seconds or the like, pulses from the pulse stretcher will pass through PDB to the pulse-driving circuit and then to the modulator which fires the magnetron in response to the received interrogation signals.

Should the interrogation signals cease for a period of time, the filament supply will nevertheless remain connected to the filament of the magnetron for a period of time after the interrogation pulses have ceased. This period of time is dependent upon the time delay of the relay control circuit. In a typical embodiment a two minute delay has been found to be appropriate. Thus, it is only after there has been a two minute cessation of interrogation pulses that the heating of the filament of the magnetron will cease and the device will switch back into its quiescent mode.

With more particular reference now to FIGURE 2, the circuits for providing certain of the above-mentioned functions will be described in greater detail. A power supply in the form of a battery is connected across terminals A and D, with D being at ground and A being +15 volts, for example. A terminal E is also provided which is actually the input terminal for the pulse stretcher, and to which pulses from the receiver R are fed. These pulses are provided to the base of a transistor T1 via resistor R2 and a diode D1. The base of transistor T1 is connected to ground via resistor R3. The emitter of this transistor is directly connected to ground and its collector is connected to the primary of a transformer TR which is connected to one end of a resistor R4 and the other end of which is connected to the +15 volts. The base of this transistor T1 is also connected to the B+ (+15 volts) via resistor R1.

The secondary of the transformer TR is connected to other circuitry outside of the pulse stretcher and will be described in further detail below. However, a resistor R38 is connected in parallel with the secondary of the transformer and another resistor R30 is connected between resistor R38 and ground.

The upper end of the primary of transformer TR is connected to the base of a second transistor T2 via a capacitor C2. The emitter of this transistor is directly connected to ground, and the collector thereof is connected to B+ via a resistor R7. It is also connected to B+ through another circuit in parallel with R7 and which includes R6 and C1 in parallel and which together are in series with the resistor R1 mentioned above. The base of transistor T2 is connected with B+ via a resistor R5.

The output of transistor T2 is connected to the base of a further transistor T3, but an integrating stage I is connected therebetween. A coupling capacitor C3 is connected between the collector of T2 and the integrating stage I and a diode D2 is connected between the output side of C3 and ground in order to provide negative clipping. The integrator circuit stage includes a resistor R8 which may be adjustable as illustrated if desired, and which is connected to the base of transistor T3 via another diode D3 for blocking out negative pulses. The base of this transistor is connected to ground via capacitor C4 and the emitter thereof is connected to ground via a capacitor C5. The elements R8, C4, and C5 provide the integrating stage for the integration of the pulses being fed thereto.

The relay control circuit includes the transistor T3, the collector of which is directly connected to B+ as is the collector of a following transistor T4, both of which are emitter followers. The emitter of T3 is connected directly to the base of T4 and the emitter of T4 is connected to ground via resistor R9. The output of T4 is connected from the emitter thereof to the vase of T6 via a resistor R10. The emitter of T6 is directly connected to ground and the collector thereof is connected to coil $a$ of relay R, so that when T6 is in conducting condition, current will flow through T6, through coil $a$ directly to B+ and thus actuate the relay into one of its two positions. T6 is an amplifier.

A current shut-off switch is provided in the form of a transistor T5 having its collector connected directly to the base of T6, and having its emitter directly connected to ground. The base of T5 is connected to ground via resistor R11 and a capacitor C7. The base of T5 is connectable with B+ also via R11 and across terminals F and H, when the relay is switched in the "on" position and then to B+.

The relay is considered to be in the "on" position when its contact K1 bridges the terminals B and C and when contact K2 bridges terminals F and H. On the other hand, the relay is considered to be in the "off" position when contact K1 provides an open circuit between terminals B and C, and contact K2 closes the circuit between terminals F and G.

A time delay stage in the form of transistors T7 and T8 is provided in which the collectors of these transistors are directly connected to B+. The base of transistor T7 is connected to the emitter of emitter follower T4 via a resistor R12. The emitter of T7 is directly connected to the base of T8. Furthermore, the emitter of T8 is connected with the emitter of T7 via a resistor R13 and a capacitor C6. It is this circuit between the emitters of T7 and T8 and including the resistor R13 and capacitor C6 in series with one another, that provides the time delay. The emitter of T8 is connected to the base of T9 through a resistor R14 and the collector of transistor T9 is connected to the collectors of T7 and T8 by a resistor R15. The emitter of T9 is directly connected to ground as at point $x$.

It may be noted that the emitter of T9 is connected to ground at $x$ and the collector thereof is connected to R15 at $y$. The collector of T9 is directly connected to the base of a transistor T11 having its emitter directly grounded and its collector connected at one end of coil $b$ of the relay R. Thus, when T11 has current passing therethrough there is a current path from ground through transistor T11 into coil *b* and thence to B+ and thus, when coil *b* is so energized, the relay is moved into its off position, which is the one which is shown in the drawings and wherein terminal F and terminal G are connected together by contact K2.

Another current shut-off switch in the form of a transistor T10 is provided for shutting off the current passing through coil *b* and through the transistor T11. This transistor T10 has its emitter directly grounded and its collector directly connected to point *y* and thus to the collector of T9 and the base of T11. Thus, in the position shown in the drawings, the base of T10 is connected to B+ through resistor R17 and resistor R16 and across the terminals G and F. A capacitor C9 is connected from the connection point between resistors R16 and R17 directly to ground. This circuitry described above is the relay control including the time delay as well as the relay R.

As has been mentioned above, a pulse disabling circuit is also provided. This pulse disabling circuit includes the portion of the circuitry which is connected to the secondary winding of transformer TR. One end of this winding is connected to a capacitor C8, the other end of which is directly connected to B+. At the transformer winding end of capacitor C8, a parallel circuit including a diode D4 and a capacitor C10 are connected directly to ground. As has been mentioned above, resistor R30 is connected between the opposite end of the winding from which C8 is connected, and ground. This winding is then directly connected to the base of a pulse gate in the form of a transistor T12. The emitter of T12 is connected directly to ground and the collector thereof feeds the pulse-driving circuit which is connected in the remainder of the circuit as indicated in FIGURE 1.

OPERATION

If the device has not been in use at all, the power switch (not shown) is turned on, the battery terminals A and B are connected with the circuitry. At this time, the circuit when connected to the battery will cause an IR drop across resistor R15 and thus a current will flow through this resistor. Thus, a base current is provided to T11 and there is flow of current from terminal A through coil *b* of relay R through the emitter collector path of T11 and to terminal D of the B+ supply. Thus, there is a surge of current through the coil causing the relay to be switched into the "off" position wherein the circuit between terminals B and C is opened and there is a closed circuit between terminals F and G due to contact K2.

Normally, there would be a constant current through coil *b* due to the conducting condition of transistor T11. However, as already mentioned hereinabove, it is an undesirable feature, since any current drain on the self contained power supply will drastically decrease the effective life of the power supply. Thus, the device is turned on and transistor T11 conducts so as to pre-set the device and establish a predetermined initial condition so that every time the device is turned on or connected with the power supply, the relay will automatically be switched to the position indicated in FIGURE 2 if it is not already in this position.

As soon as the relay switches contact K2 into this position, base current is supplied to T10 through B+ via terminal A, terminals F and G, resistor R16 and resistor R17. Thus, T10 is placed into the conducting condition which places point *y* at ground level, and thus, the base of T11 is grounded and it is removed from its conducting condition. Accordingly, there is no longer flow through coil *b* and the relay is already in its desired position.

Now, with the relay in its off position it is actually in the quiescent mode. During this mode, the filament supply is disconnected from the filament of the magnetron. Furthermore, during this quiescent mode, the capacitor C8, which provides the pulse disabling feature, is constantly charged so that it is available for providing a pulse disabling delay, in a manner which will be explained in more detail below.

It will now be assumed that an interrogating radar signal is emitted from an interrogation station and is detected by receiver R. These pulses are applied to terminal E and will be of about 1 microsecond in duration, for example. These pulses pass through transistor T1 through transistor T2 and during this passage this stage, which is the pulse stretcher, stretches these pulses to about 160 microseconds in duration. The pulses are then provided to the integrator I.

The capacitor C5 becomes charged by the first few pulses which are applied thereto. It does not become sufficiently charged by just a single pulse, in order to assure that genuine pulses are received and not a spurious signal. Thus, by waiting until two, three, four, or more pulses have been received it is assured that there is a desirable signal, and not just a random spurt of noise or the like. The device is thus discriminatory against spurious signals.

When the capacitor C5 is sufficiently charged, the transistor T3 will be turned on as will T4 and T6. When the amplifier T6 is turned on a surge of current will flow through coil *a* of relay R and contact K1 will bridge terminals B and C, while contact K2 will bridge terminals F and H. At this point, since a latching relay R is used, and it is desired that current does not continue to flow through coil *a*, a current shut-off switch in the form of a transistor T5 is utilized.

When the contact K2 bridges terminals F and H, the base of transistor T5 is connected directly to B+ via resistor R11 and thus a current is supplied to the base of T5 and brings it to conducting condition. When transistor T5 begins conducting, it brings the base of T6 to ground level and thus transistor T6 is blocked which prevents current flow through coil *a* of the relay. Furthermore, any further pulses which are supplied to the base of T6 from the preceding stages of this circuit are immediately carried to ground, so that in effect the received pulses at this point are being shorted out or grounded.

With terminals B and C connected, the filament supply is connected either directly or indirectly with the filament of the magnetron so that this filament can heat up to operating temperature. At the same time, the signals which are supplied to terminal E are provided, via the secondary of transformer TR, to the gate T12. However, the pulses will be blocked at this point due to the discharge of capacitor C8, the discharge of which prevents operation of transistor T12 for a period of about 45 seconds for example.

The diode D4 in the circuit associated with capacitor C8 is directly in the charge path of this capacitor in order to retain the transformer out of the charge path, and in order to prevent T12 from being switched to its conducting position while charging of capacitor C8 is taking place. The discharge of capacitor C8 provides a negative voltage which appears across R30 and provides a negative base bias to T12 and thus holds T12 in a blocked condition. After the designed disabling delay of 45 seconds, the charge on C8 has decayed a sufficient amount to allow pulses to then pass through the gate T12, to the pulse-driving circuit. In meantime, it should be noted that the filament of the magnetron has been sufficiently heated to allow it to be in proper operating condition, so that it is fully available for proper operation.

When the circuit is in this condition, as long as pulses are being delivered to terminal E, the relay R will remain in its on condition, and pulses will pass through gate T12 to the pulse-driving circuit and then on to the magnetron.

Assume now, that there has been an interruption of pulses arriving at terminal E. During the entire time, the pulses have been arriving and passing through the circuit which has just been described, they are also passing through resistor R12 to the base of T7 and have been charging capacitor C6. Thus, periodically received pulses on the base of T7 have been supplying collector currents through T7 to retain C6 in a charged condition.

Now, when pulses cease to be applied to the base of T7, transistor T8 would tend to turn off during the interval between pulses except for the fact that C6 is a relatively large capacitor which supplies base current to T8 in the interval between pulses. Since current is supplied to the base of T8 to hold it in conducting condition, it, in turn, supplies base current to T9 and T9 is in conducting condition, so that point y, which is directly connected to the base of T11, is held at ground level. Thus, while pulses are being delivered into the circuit, transistors T7, T8 and T9 are held in the conducting condition. Furthermore, if pulses should cease then the capacitor C6 retains transistors T8 and T9 in the conducting condition.

The circuit may be so designed that C6 will retain T8 in the conducting condition for 2 minutes for example, even though pulses are not arriving at the base of T7. Thus, the capacitor C6 plus the input impedance of the emitter follower T8 must be considered and the emitter resistance times (x) the resistance of R13 which is 10K ohms for example, provides a very large figure which will look like a megohm or so of impedance as far as the discharge of the capacitor is concerned. Thus, to provide a 120 second delay will require about x number of time constants of C6–R13 and the transistor T8 is accordingly so designed.

Now, if pulses again arrive at terminal E at some period during this delay, the capacitor C6 will then be charged and the circuit will continue operation as mentioned previously. However, if no further pulses should appear at terminal E for two minutes, then the charge on C6 will have leaked off a sufficient amount for T8 to cease operation which also ceases operation of T9. At this point, point y is no longer at ground level but is rather at a point which is dependent upon the IR drop across resistor R15. This provides a base current for T11 and, thus, current may surge through coil b of the relay in order to switch the relay to the off condition and thus prevent a drain on the filament supply voltage.

It may thus be realized that the present invention provides a circuit which will adjust itself automatically to a quiescent mode to prevent a drain on the power supply if no pulse should be received for a predetermined amount of time. Thus, there is not only the benefit of the device automatically shutting off upon cessation of pulses, but there is also the provision that if pulses are stopped only temporarily, the device will not shut off. Thus, a preferred embodiment of a circuit has been disclosed which is exceedingly effective for the purposes described.

If desired, the resistor R8 of the integrating stage I may be made adjustable in order to provide adjustment for the number of pulses which must be received in the integrating circuit before transistor T4 will go into operation. FIGURE 3 illustrates another method of providing adjustment of the integrating circuit, and in this instance, further capacity may be connected in parallel with capacitor C5. Thus, a further capacitor C5a and still a further capacitor C5b are connected in parallel with C5. Switches K5a and K5b are provided to connect the capacitors C5a and C5b, respectively, into the circuit in order to provide adjustment for the number of pulses which are required to cause transistor T4 to go into operating condition.

Still further, the time delay provided by capacitor C6 may be varied in order to vary the amount of the time delay and for this purpose, two capacitors C6a and C6b are connected in parallel with capacitor C6. Switches K6a and K6b are provided in order to switch capacitors C6a and C6b, respectively, into the circuit. This feature is clearly shown in FIGURE 4.

An example of a specific circuit will now be given.

*Example*

A typical circuit such as that shown in FIGURE 2 will be constructed with components having the following values:

RESISTORS

| | |
|---|---|
| R1=270K ohms | R11=6.8K ohms |
| R2=150 ohms | R12=2.2K ohms |
| R3=12K ohms | R13=10K ohms |
| R4=5.6K ohms | R14=10K ohms |
| R5=22K ohms | R15=10K ohms |
| R6=12K ohms | R16=15K ohms |
| R7=2.7K ohms | R17=6.8K ohms |
| R8=22K ohms | R30=1.0 megohm |
| R9=1K ohm | R38=68 ohms |
| R10=5.6K ohms | |

CAPACITORS IN MICROFARAD

| | |
|---|---|
| C1=.001 | C6=47 |
| C2=.01 | C7=0.5 |
| C3=.01 | C8=47 |
| C4=.01 | C9=0.5 |
| C5=0.5 | C10=.01 |

TRANSISTORS

| | |
|---|---|
| T1=2N929 | T7=2N929 |
| T2=2N929 | T8=2N929 |
| T3=2N929 | T9=2N929 |
| T4=2N929 | T10=2N743 |
| T5=2N743 | T11=2N697 |
| T6=2N697 | |

OTHER COMPONENTS

All diodes D=IN916
TR=TT201—0.5 of PCA
R=FL11D of Potter Brumfield

The preceding specific example illustrates the principle of the present invention and is not to be construed as limiting the invention thereto since many other embodiments thereof may be determined after a consideration of the above disclosure.

Although the circuit of FIGURE 2 has been described as receiving pulses which result from interrogation pulses being detected by the receiver, these pulses may be considered as being control signals. Furthermore, although the circuit described is responsive to the two conditions: (a) presence of pulses, and (b) absence of pulses, it could very well be constructed for use with pulses or control signals having different energy levels. Thus, control signals having at least two levels will include (1) presence and absence of pulses, and also (2) other signals having two different levels. In this context, a zero level is considered to be a control signal since it indicates a certain condition and contributes to the control of the circuit.

It will be understood that the above description of the present invention is susceptible to various modifications, changes, and adaptations, and the same are intended to be comprehended within the meaning and range of equivalents of the appended claims.

What is claimed is:

1. A switching arrangement, comprising, in combination:
   (a) a latching relay having two positions controlled by two control windings;
   (b) a first control circuit responsive to control signals connected to one of said windings for energizing it and switching the relay to one position;
   (c) a second control circuit responsive to absence of control signals connected to the other of said windings for energizing it and switching the relay to the other position; and
   (d) means connected to said control circuits to inactivate them and de-energize the associated windings immediately after energization of a winding to eliminate constant current flow in the windings.

2. A control device for use in actuating, in response to control signals, a device requiring a warm-up period, comprising, in combination:
  (a) a relay controlling a contact for movement between two positions for starting and stopping the warm-up period, respectively;
  (b) control signal presence responsive means connected to said relay for moving said contact into the starting position; and
  (c) control signal absence responsive means connected to said relay for moving said contact into the stopping position after a predetermined time period during which no control signals have been detected.

3. A switching arrangement, comprising, in combination:
  (a) a latching relay having two positions controlled by two control windings;
  (b) a first control circuit responsive to control signals connected to one of said windings for energizing and switching the relay to one position;
  (c) a second control circuit responsive to absence of control signals connected to the other of said windings for energizing it and switching the relay to the other position after a predetermined period during which no control signals have been detected; and
  (d) means connected to said control circuits to inactivate them and de-energize the associated windings immediately after energization of a winding to eliminate constant current flow through the windings.

4. In a transponder receiving control signals, the combination which comprises:
  (a) a magnetron;
  (b) power supply circuit means connected to said magnetron to heat the filament thereof, and including a switch for connecting and disconnecting the circuit means from the filament; and
  (c) switch control means for connecting said circuit means with the filament upon detection of control signals and for disconnecting said circuit means from the filament after a predetermined time period during which no control signals have been detected; said switch control means including a latching relay having two control coils, an amplifier connected to each of said control coils for sending a current surge therethrough to thereby energize the associated coil and control said switch.

5. A combination as defined in claim 4 wherein said switch control means further includes a current shut-off switch connected to each amplifier for immediate activation upon the associated amplifier energizing its coil for preventing, after an initial current surge, further current from passing through said amplifier and thus said coil.

6. A combination as defined in claim 5 wherein said control means includes a further switch controlled by said relay for operating said current shut-off switches.

References Cited in the file of this patent
UNITED STATES PATENTS

| | | |
|---|---|---|
| 2,243,719 | Peterson | May 27, 1941 |
| 2,750,503 | Gottier | June 12, 1956 |
| 3,026,455 | Smith | Mar. 20, 1962 |